(12) United States Patent
Pekarske et al.

(10) Patent No.: US 11,336,466 B1
(45) Date of Patent: May 17, 2022

(54) PROVISIONING SYSTEM FOR CLOUD-CONNECTED PRINTERS

(71) Applicant: ZEBRA TECHNOLOGIES CORPORATION, Lincolnshire, IL (US)

(72) Inventors: Andrew J. Pekarske, Mundelein, IL (US); James P. Van Huis, Des Plaines, IL (US); Ryan E. Brock, Cary, IL (US); Jared Coy Roundy, Meridian, ID (US)

(73) Assignee: Zebra Technologies Corporation, Lincolnshire, IL (US)

(*) Notice: Subject to any disclaimer, the term of this patent is extended or adjusted under 35 U.S.C. 154(b) by 0 days.

(21) Appl. No.: 17/118,046

(22) Filed: Dec. 10, 2020

(51) Int. Cl.
| | |
|---|---|
| *H04L 9/32* | (2006.01) |
| *G06F 3/12* | (2006.01) |
| *H04N 1/00* | (2006.01) |
| *G06F 21/60* | (2013.01) |

(52) U.S. Cl.
CPC .......... *H04L 9/3268* (2013.01); *G06F 3/1224* (2013.01); *G06F 3/1238* (2013.01); *G06F 21/608* (2013.01); *H04L 9/3265* (2013.01); *H04N 1/00244* (2013.01)

(58) Field of Classification Search
None
See application file for complete search history.

(56) References Cited

U.S. PATENT DOCUMENTS

| | | | |
|---|---|---|---|
| 7,489,243 B2 | 2/2009 | Brown et al. | |
| 7,707,405 B1* | 4/2010 | Gilman | H04L 9/083 |
| | | | 713/156 |
| 10,318,216 B2 | 6/2019 | Anno | |
| 2007/0150420 A1* | 6/2007 | Iwamoto | H04L 9/3273 |
| | | | 705/71 |
| 2008/0211840 A1 | 9/2008 | Zevin et al. | |
| 2014/0240753 A1* | 8/2014 | Anno | G06F 3/1206 |
| | | | 358/1.15 |
| 2016/0371032 A1 | 12/2016 | Hill et al. | |
| 2018/0212950 A1* | 7/2018 | Nogawa | H04N 1/00244 |

* cited by examiner

*Primary Examiner* — Thomas D Lee (57) ABSTRACT

A method, in a provisioning server, of provisioning a printer, includes: receiving a provisioning request from the printer, the provisioning request containing (i) a printer identifier, and (ii) an account identifier associated with the printer; obtaining, from a digital certificate issuer, a unique string; sending the unique string to the printer; receiving from the printer, in response to sending the unique string, a certificate signing request containing (i) the printer identifier, (ii) the account identifier, and (iii) an authentication token including the unique string signed with a private key of the printer; validating the certificate signing request; passing the validated certificate signing request to the digital certificate issuer; receiving, from the digital certificate issuer, a digital certificate encoding the printer identifier and the account identifier; and providing the digital certificate to the printer for storage.

20 Claims, 5 Drawing Sheets

PROVISIONING SYSTEM FOR CLOUD-CONNECTED PRINTERS

BACKGROUND

Printers are typically controlled via direct physical interaction between operators and printers, e.g. using a control panel, touch screen or the like implemented on the printer. Printers may also be controlled over local networks, e.g. from a personal computer connected to the same local network. Controlling such printers via commands received from servers outside the above local network, e.g. relayed through such servers from operators using mobile devices or the like, is typically not feasible, however.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method, in a provisioning server, of provisioning a printer, the method comprising: receiving a provisioning request from the printer, the provisioning request containing (i) a printer identifier, and (ii) an account identifier associated with the printer; obtaining, from a digital certificate issuer, a unique string; sending the unique string to the printer; receiving from the printer, in response to sending the unique string, a certificate signing request containing (i) the printer identifier, (ii) the account identifier, and (iii) an authentication token including the unique string signed with a private key of the printer; validating the certificate signing request; passing the validated certificate signing request to the digital certificate issuer; receiving, from the digital certificate issuer, a digital certificate encoding the printer identifier and the account identifier; and providing the digital certificate to the printer for storage.

Additional examples disclosed herein are directed to a provisioning server, comprising: a communications interface; and a processor configured to: receive a provisioning request from the printer, the provisioning request containing (i) a printer identifier, and (ii) an account identifier associated with the printer; obtain, from a digital certificate issuer, a unique string; send the unique string to the printer; receive from the printer, in response to sending the unique string, a certificate signing request containing (i) the printer identifier, (ii) the account identifier, and (iii) an authentication token including the unique string signed with a private key of the printer; validate the certificate signing request; pass the certificate signing request to the digital certificate issuer; receive, from the digital certificate issuer, a digital certificate encoding the printer identifier and the account identifier; and provide the digital certificate to the printer for storage.

Further examples disclosed herein are directed to a method to provision a printer, the method comprising: obtaining, at the printer, (i) a network identifier of a provisioning server, and (ii) an account identifier associated with the printer; transmitting, to the provisioning server using the network identifier, a provisioning request containing (i) a printer identifier, and (ii) the account identifier; receiving a unique string from the provisioning server; generating a certificate signing request containing (i) the printer identifier, (ii) the account identifier, and (iii) an authentication token based on the unique string; sending the certificate signing request to the provisioning server for validation; receiving a digital certificate encoding the printer identifier and the account identifier; and storing the digital certificate in a memory of the printer.

Figure 1:
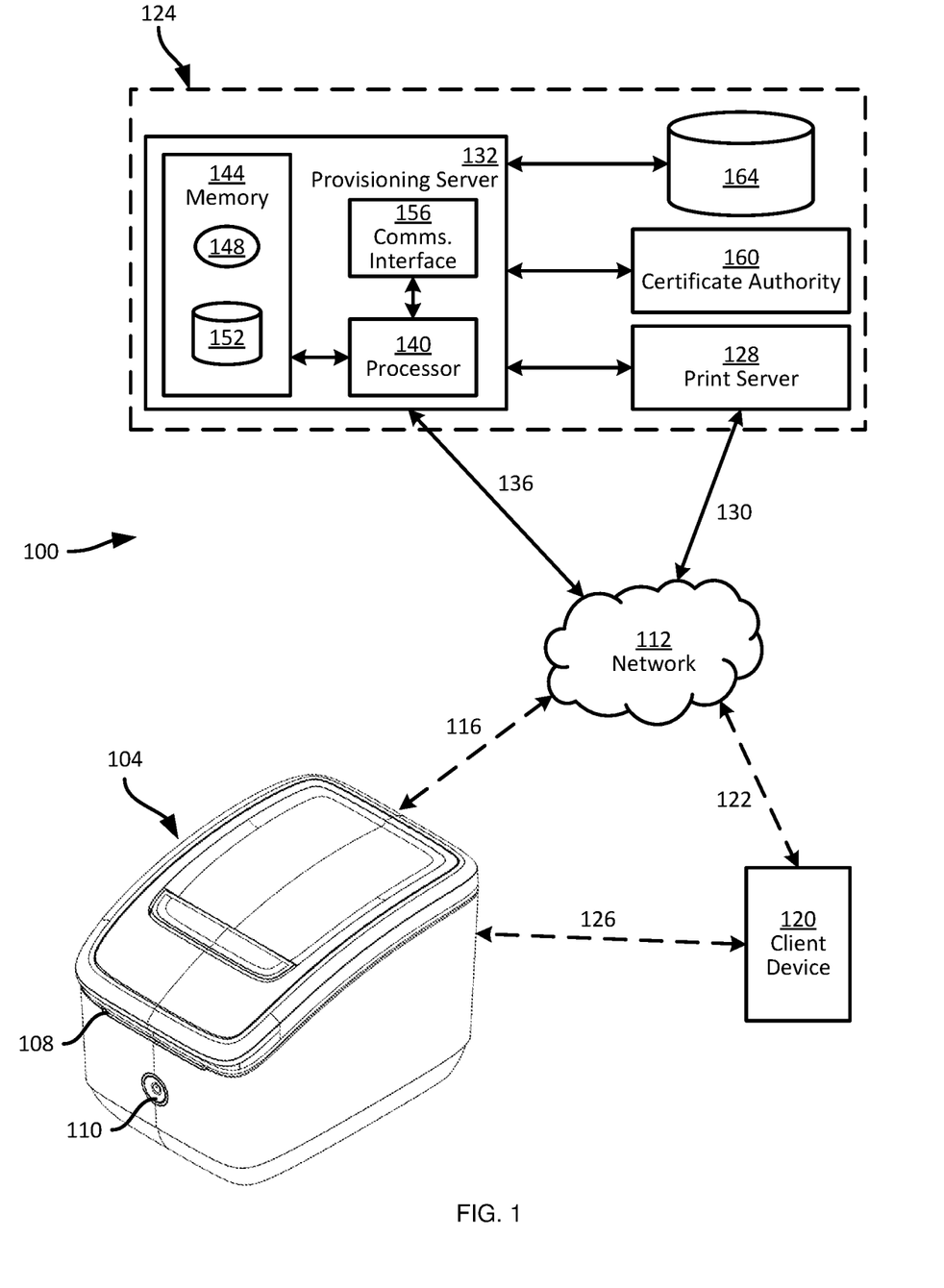
FIG. 1 is a diagram of a system for provisioning a printer.

FIG. 1 illustrates a system 100 for provisioning cloud-connected printers. The system 100 includes a printer 104, which in the present example includes a label printer configured to apply indicia (e.g. via a thermal print head, although any of a variety of other impression technologies may be employed by the printer 104) to label from a supply of labels housed within the body of the printer 104. Processed labels may be dispensed from an outlet 108 of the printer 104.

The printer 104 may be, for example, a desktop label printer, configured to process labels with widths between about two inches and about four inches. In other words, the housing of the printer 104 may be relatively small and may therefore omit operator controls such as a keypad, a touch screen, or the like. Instead, the physical operator interface of the printer 104 may be limited to a power button 110. Control of the printer 104 may instead be effected by sending commands to the printer 104 via a network 112, including any suitable combination of local and wide-area networks. Specifically the printer 104 may be connected to the network 112 via a link 116 (e.g. a wireless link, as indicated by the dashed lines in FIG. 1) to a local network, which is in turn connected to a wide-area network. The printer 104 therefore includes a controller and a communications interface, e.g. to communicate with other devices for receipt of such commands, and to control the print head and other components of the printer 104 to act on the commands.

Commands for transmission to the printer 104 may be generated from a variety of computing devices, such as a client device 120 connected to the network via a link 122. The client device 120 may be a smartphone, a tablet computer, or the like. In general, the client device 120 can initiate commands for the printer 104 by authenticating with a print cloud subsystem 124 (e.g. via a previously assigned login ID and password corresponding to an account maintained within the subsystem 124), and transmitting such commands to the subsystem 124 for subsequent processing and relay to the printer 104. The client device 120 may also establish a direct connection 126, e.g. via Bluetooth or other local connections, with the printer 104, e.g. to initiate provisioning of the printer 104.

As will be apparent, the cloud-connected operation of the printer 104 may also be applied to other forms of printer, including those with sufficient surface area to incorporate operator interfaces. The ability to accept commands from the subsystem 124 enables such printers, in addition to local operation, to receive print jobs originated from a wide variety of locations and computing devices that would otherwise be unable to issue such print jobs to the printer.

The subsystem 124 encompasses a variety of functions related to enabling remote control and management of printers such as the printer 104. Certain functions are illustrated as being implemented by distinct components within the subsystem 124, as discussed below. In other examples, however, the functions of the subsystem 124 may be implemented by a different subset of components, or on a single logical server.

The subsystem 124, in this example, includes a print server 128 connected with the network 112 via a link 130. The print server 128 can implement functions such as authenticating the client device 120 prior to accepting print commands from the client device 120, as well as maintaining associations between client devices and printers. Such associations may define which client devices 120 are permitted to issue commands to which printers. The printer 104 can be configured, e.g. when powering on or resuming operations after being in low-power state, to establish a secure connection with the server 128, to enable the printer 104 to receive commands from the print server 128.

To establish a secure connection with the printer server 128, the printer 104 generally connects to a local network as noted above. However, when the printer 104 is first deployed, e.g. to a customer site, the printer 104 may not have network configuration information enabling such a local connection. In addition, the print server 128 may be deployed as a collection of geographically distinct servers, and the printer 104 may not have information (such as a uniform resource locator (URL) corresponding to an appropriate print server) in an out-of-box state.

In addition, because the subsystem 124 in general, and the print server 128 in particular, may be accessible to a wide range of printers and client devices associated with different accounts, establishment of the secure connection noted above may serve to allow only authentic printers (e.g. produced by a particular manufacturer) to connect, and also to limit control of each printer to only the client devices associated with the account linked to a given printer. As in the case of the local network connection, when the printer 104 is newly deployed, an association between the printer 104 and the account associated with the client device 120 may not yet have been established.

The subsystem 124 is therefore configured to perform various actions to provision the printer 104, e.g. when the printer 104 is newly deployed, or re-deployed to a new operator. In particular, the subsystem 124 includes a provisioning server 132 connected to the network 112 via a link 136. The provisioning server 132 includes a processor 140 (e.g. a central processing unit (CPU)), interconnected with a non-transitory computer readable storage medium, such as a memory 144. The memory 144 includes a combination of volatile memory (e.g. Random Access Memory or RAM) and non-volatile memory (e.g. read only memory or ROM, Electrically Erasable Programmable Read Only Memory or EEPROM, flash memory). The processor 140 and the memory 144 each comprise one or more integrated circuits. The memory 144 stores computer readable instructions executable by the processor 140 to perform various functionality to configure the printer 104 for secure connection to the print server 128. In particular, the memory 144 stores a provisioning application 148 executable by the processor 140 to perform various actions discussed herein.

The memory 144 can also store data for use in provisioning the printer 104, such as a repository 152 containing account identifiers, network identifier corresponding to print servers (such as the print server 128), and the like.

The provisioning server 132 also includes a communications interface 156 interconnected with the processor 140. The communications interface 156 includes suitable hardware (e.g. transmitters, receivers, network interface controllers and the like) allowing the server 132 to communicate with other computing devices—particularly the printer 104 and the other components of the subsystem 124.

Those other components include, in addition to the print server 128, a certificate authority 160, which may be implemented as a distinct computing device from the provisioning server 132. The certificate authority 160 is configured to generate digital certificates for use by other devices, such as the printer 104 in this example, certifying the identities of such devices for the establishment of secure communications.

The subsystem 124 also includes a repository 164, e.g. stored on a further server or set of servers, storing manufacturing and/or supply chain data corresponding to printers including the printer 104. The data stored in the repository 164 can include unique identifiers of each printer that can be provisioned via the subsystem 124. Such identifiers can include serial numbers, media access control (MAC) addresses, or the like, that are generally assigned to printers at the time of manufacture. The repository 164 can also store identifiers of individual printer components. For example, the printer 104 can include an auxiliary controller such as cryptographic accelerator chip configured to assist in establishing secure connections between the printer 104 and the print server 128 or other computing devices. The accelerator chip itself may have a unique identifier, which can be stored in the repository 164 in association with the printer identifier. In further examples, the printer 104 can be supplied with media (e.g. labels) via a replaceable cartridge. The cartridges themselves can include embedded circuits storing unique identifiers, e.g. indicating that the cartridges are authentic. The repository 164 may therefore also store a set of identifiers corresponding to manufactured cartridges.

The print server 128, the certificate authority 160, and the repository 164 are shown as being directly connected to the provisioning server 132. In some examples, the connections between the components of the subsystem 124 may also traverse the network 112.

Figure 2:
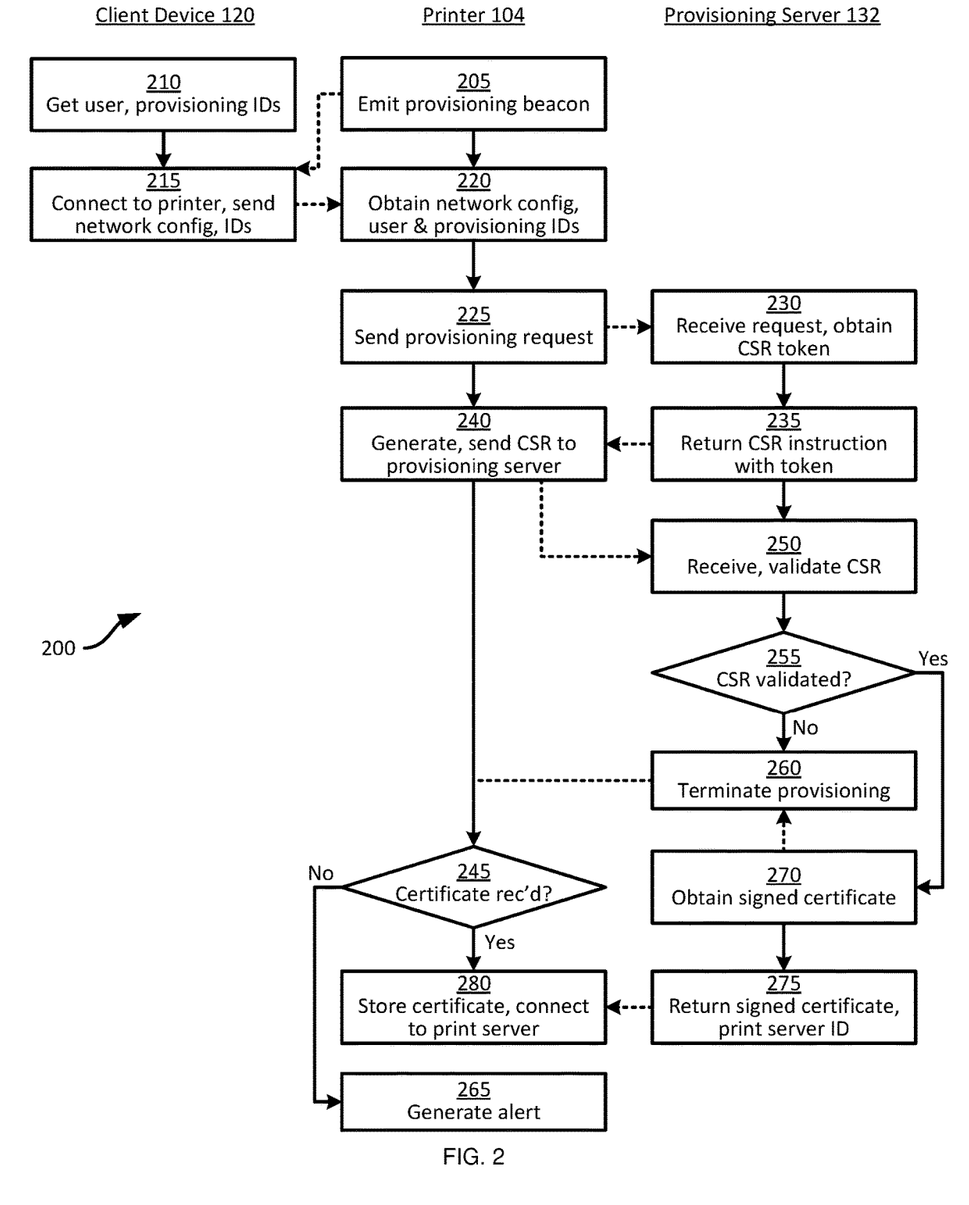
FIG. 2 is flowchart of a method for provisioning a printer.

Turning to FIG. 2, a method 200 of provisioning printers is illustrated. The method 200 will be described in conjunction with its performance within the system 100. Certain blocks in the method 200 are performed by the client device 120, while others are performed by the printer 104 and still others are performed by the provisioning server 132. As will be apparent in the discussion below, performance of the method 200 by the devices shown in FIG. 2 may also involve interactions with the other components of the subsystem 124.

As noted earlier, when the printer 104 is newly deployed, or redeployed (e.g. after maintenance or transfer to a different owner), the printer 104 lacks network configuration data enabling it to connect to the network 112, and also lacks an association with a particular account identifier. Further, the printer 104 lacks a digital certificate enabling establishment of secure connections with the print server 128.

At block 205, the printer 104 is configured, e.g. upon powering on, to detect that it has not been provisioning, and to periodically emit a provisioning beacon using a local networking technology such as Bluetooth (e.g. Bluetooth Low Energy (BLE)). The provisioning beacon can include the printer identifier such as the serial number and/or MAC address noted above. The provisioning beacon may also include a status indicator indicating that the printer 104 is un-provisioned. Other status indicators may be employed when the printer 104 has been provisioned but is not currently connected to the client device 120, for example.

At block 210, e.g. contemporaneously with emission of the beacon by the printer 104, the client device 120 is configured to obtain an account identifier (also referred to as a user identifier herein) and a network identifier of the provisioning server 132, from the print server 128. For example, the client device 120 can be configured to create an account at the print server 128 and thereby obtain an account identifier and any necessary authentication data (e.g. a password). Alternatively, the client device 120 may authenticate a previously created account identifier with the print server 128 in order to receive the network identifier of the provisioning server 128. The network identifier can include, for example, a URL or the like, enabling computing devices outside the subsystem 124 to send data to the provisioning server 132 via the network 112.

At block 215, having obtained the account identifier and provisioning server identifier, the client device 120 is configured to detect the beacon emitted by the printer 104, establish a local connection with the printer 104, and provide network configuration information as well as the above-mentioned identifiers to the printer 104. For example, upon establishing a local connection with the printer 104, the client device 120 may receive from the printer 104 a list of local wireless networks detected by the printer 104. The client device 120 can receive a selection of one of the networks detected by the printer 104, and provide to the printer 104 (via the local connection) authentication data such as a network key, allowing the printer 104 to connect to that network, and thus to the network 112. The printer 104 therefore receives, at block 220, the network configuration information, as well as the account and provisioning server identifiers.

Figure 3:
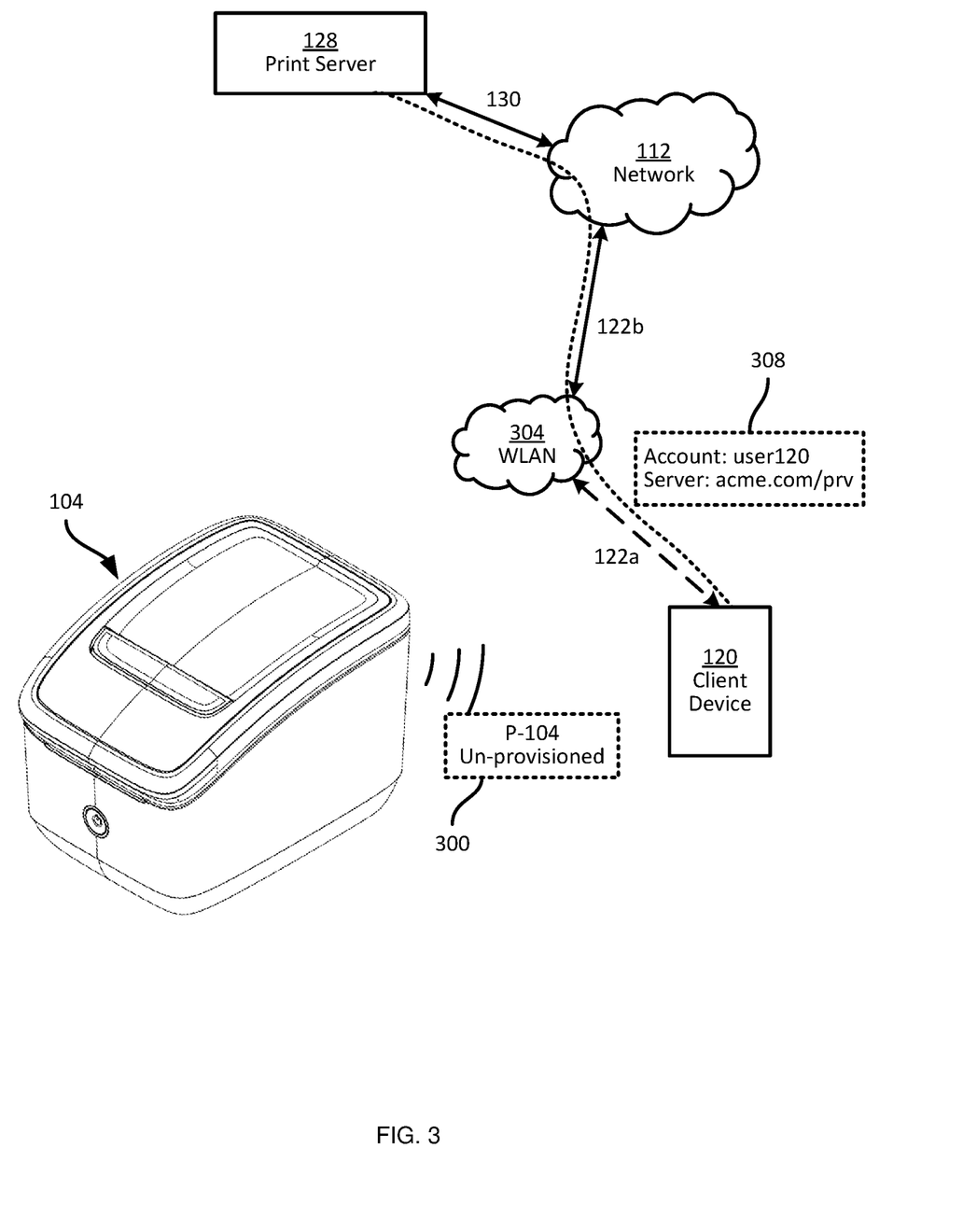
FIG. 3 is a diagram illustrating an example performance of blocks 205 and 210 of the method of FIG. 2.

Turning to FIG. 3, a portion of the system 100 is shown in greater detail during the performance of blocks 205 and 210. The printer 104, as noted above, emits a beacon 300 containing an identifier ("P-104" in this example) of the printer 104, and an indication that the printer 104 has not yet been provisioned. The indication can be provided in the form of a flag, numerical value, or the like in other examples.

The client device 120 is shown having established a connection to the print server 128 via the link 122, which in this example is implemented as a first leg 122a connecting the client device 120 to a wireless local area network (WLAN) 304, and a second leg 122b to the network 112. The client device 120 further obtains, over the above connection, an account identifier (e.g. "user120") and a URL corresponding to the provisioning server 132 (e.g. "acme.com/prv") via a message 308.

Figure 4:
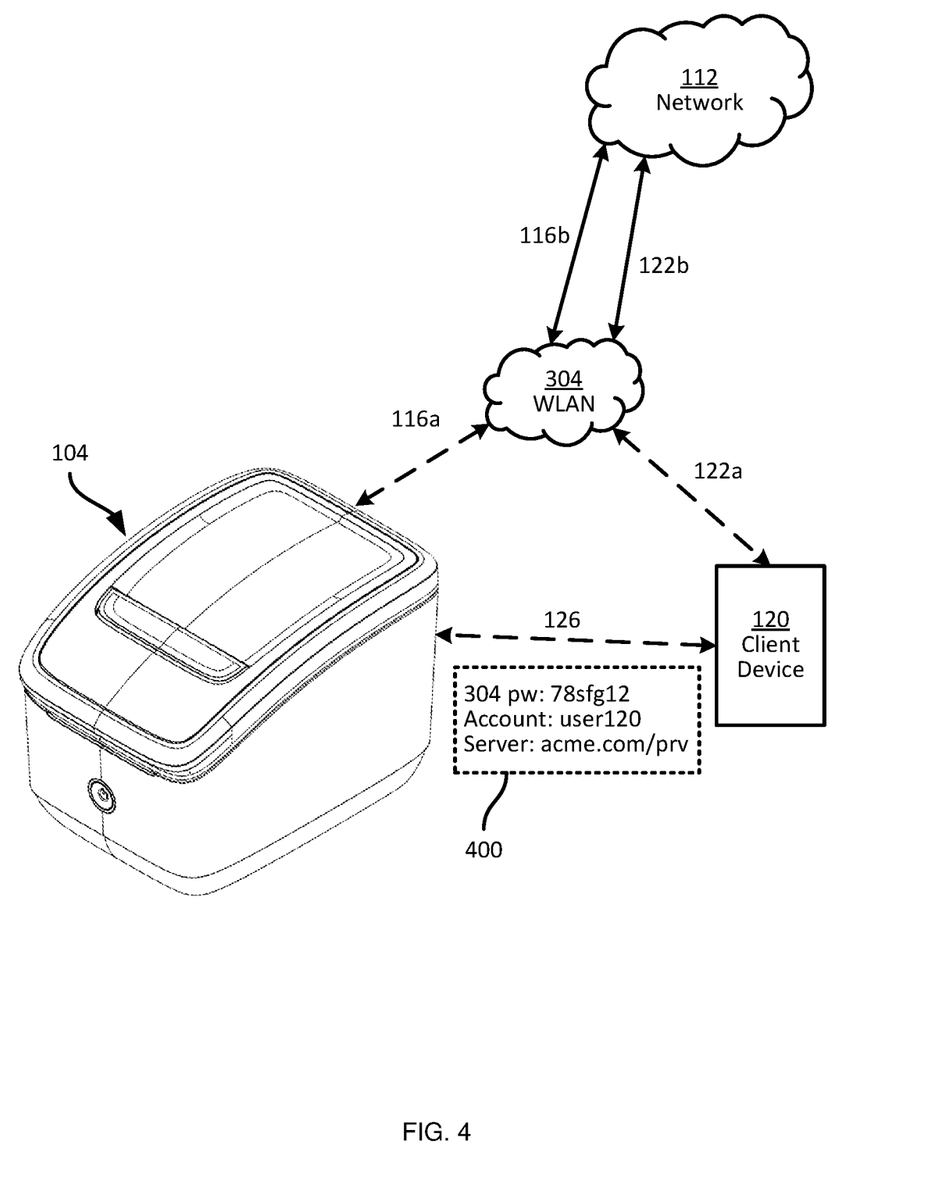
FIG. 4 is a diagram illustrating an example performance of blocks 215 and 220 of the method of FIG. 2.

FIG. 4 illustrates an example performance of blocks 215 and 220. In particular, the client device 120 establishes a local connection 126 with the printer 104, and over the connection 126 provides the printer 104 with a set 400 of information. The set 400 includes configuration information for the WLAN 304, such as an identifier (e.g. an SSID) of the WLAN 304 and a password for connecting to the WLAN 304. The set 400 also includes the account identifier and URL for the provisioning server 132 mentioned above. At block 220, therefore, the printer 104 can receive the above information and establish a connection 116a with the WLAN 304. The connection 116a, along with a second leg 116b between the WLAN 304 and the network 112, allows the printer 104 to contact other computing devices via the network 112, including the provisioning server 132.

Returning to FIG. 2, at block 225 the printer 104 is configured to send a provisioning request to the provisioning server 132 via the network 112. The provisioning request is addressed using the provisioning server identifier obtained at block 220, and includes at least the printer identifier, and the account identifier. The request can be transmitted along with a generic digital certificate installed on the printer 104 at the time of manufacture. The provisioning request may also include other information in some examples such as a cartridge identifier or the like.

At block 230, the provisioning server 132 is configured to receive the provisioning request from the printer 104, and to obtain a certificate signing request (CSR) token, e.g. from the certificate authority 160. The CSR token is a unique string (e.g. of alphanumeric characters) that will subsequently be used by the printer 104 and the certificate authority 160 to generate a digital certificate for the printer 104. The CSR token can, for example, be generated randomly by the certificate authority 160 upon request by the provisioning server 132.

At block 235, the provisioning server 132 is configured to return the CSR token to the printer 104, along with an instruction to generate a CSR message. The printer 104, at block 240, is configured to generate a CSR message according to the instruction from the provisioning server 132. The CSR message includes the printer identifier and the customer identifier. The CSR message also includes an authentication token that includes at least the above-mentioned CSR token, signed with a private key associated with the printer 104. In particular, the CSR token can be signed using a private key of the above-mentioned cryptographic accelerator chip to generate the authentication token. The CSR message also includes, in this example, a digital certificate including a public key of the cryptographic accelerator chip, or any other suitable component of the printer used to generate the authentication token.

Figure 5:
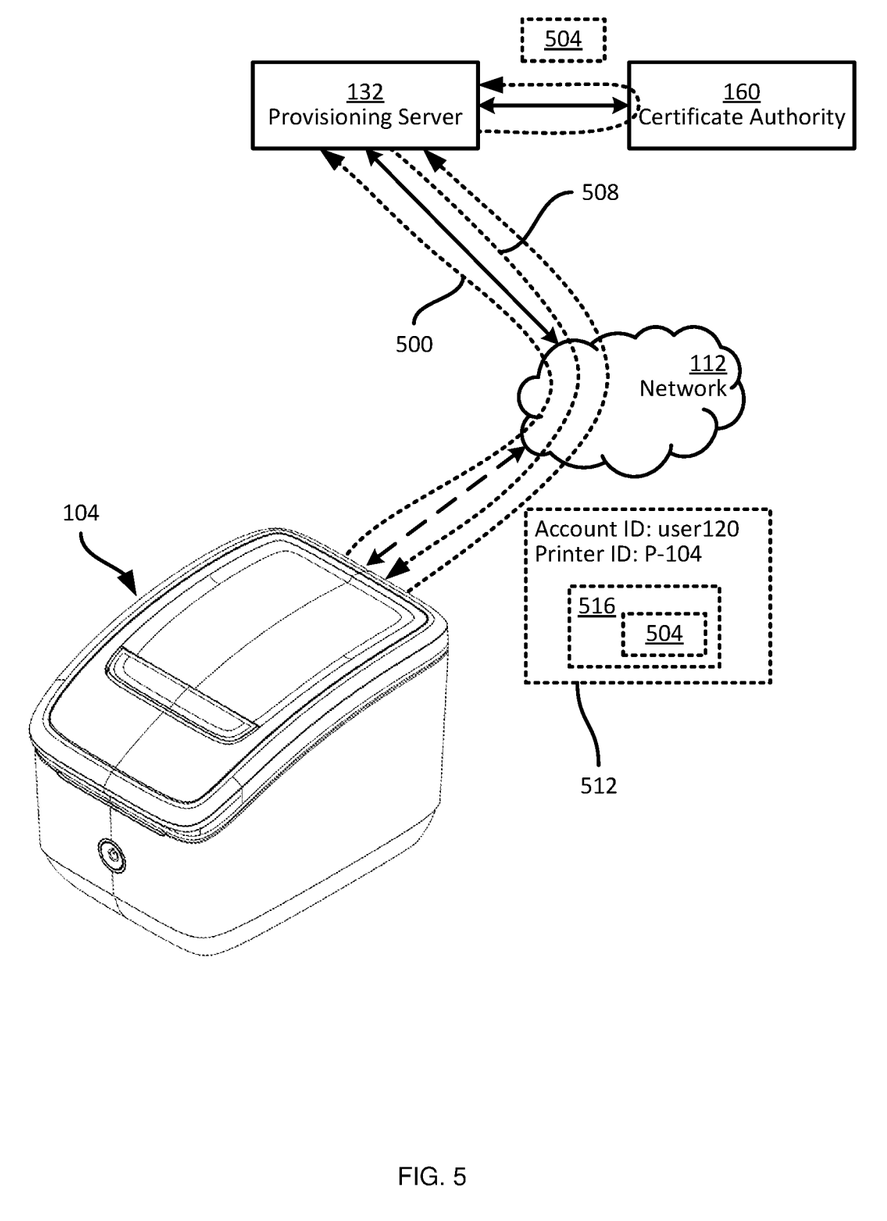
FIG. 5 is a diagram illustrating an example performance of blocks 225, 230, 235, and 240 of the method of FIG. 2.

Turning to FIG. 5, an example performance of blocks 225, 230, 235, and 240 is illustrated. Specifically, the printer 104 sends a provisioning request 500 at block 225. In response to receipt of the request 500, the provisioning server 132 obtains a CSR token 504 from the certificate authority 160 at block 230, and returns the CSR token 504 to the printer 104 in a further message 508 at block 235. At block 240, the printer 104 generates and sends a CSR message 512, containing the account and printer identifiers, as well as an authentication token 516 containing the signed CSR token 504.

Returning to FIG. 2, in response to sending the CSR message 512, the printer 104 waits at block 245 for the receipt of a digital certificate, or an error message in the event that the CSR is denied. At block 250, the provisioning server 132 is configured, upon receipt of the CSR message 512, to validate the CSR.

To validate the CSR, the provisioning server 132 can perform any one or more of a set of validation actions. For example, the server 132 can verify, e.g. from the repository 164, whether the printer identifier is listed as associated with an authentic printer. If the CSR and/or the provisioning request from block 225 includes other component identifiers, such as an identifier of a cartridge, an identifier of the cryptographic accelerator chip (e.g. the digital certificate of the cryptographic accelerator chip), the server 132 can also retrieve data from the repository 164 indicating whether such components are associated with the printer identifier.

The server 132 can also verify a chain of trust associated with the digital certificate of the cryptographic accelerator chip in some examples. For example, the server 132 can send a request to the certificate authority 160, or another authority according to the provenance of the cryptographic accelerator chip digital certificate. Still further, the server 132 can verify from the repository 164 that the account identifier received in the CSR message 512 is a valid account identifier.

The provisioning server 132 determines, at block 255, whether the CSR is valid, based on a suitable set of the criteria set out above. If any of the criteria applied fails, the determination at block 255 is negative, and the server 132 proceeds to block 260. At block 260, the server 132 terminates provisioning of the printer 104, and may send a message indicating that provisioning has been terminated to either or both of the printer 104 and the client device 120. The printer 104 may therefore determine at block 245 that a digital certificate has not been received, and may generate an alert at block 265 to indicate that the printer 104 remains un-provisioned.

When the determination at block 255 is affirmative, however, the server 132 proceeds to block 270. At block 270, the server 132 obtains a digital certificate corresponding to the printer 104, e.g. by transmitting the validated CSR to the certificate authority 160 for generation of the certificate. The certificate authority 160 itself may perform a validation function, including decrypting the authentication token 516 using the printer's public key, and comparing the resulting CSR token 504 with the CSR token originally provided by the certificate authority 160 to the server 132. If the tokens match, the certificate authority 160 may determine that the printer 104 is the true owner of the public key in the CSR message 512 (e.g. the cryptographic accelerator certificate mentioned earlier). The certificate authority 160 may therefore generate a signed digital certificate for the printer 104, that includes the account identifier and the printer identifier. When the tokens do not match, the certificate authority 160 may return an error message to the server 132, which may in turn terminate provisioning at block 260 (as indicated in FIG. 2 by a dashed line returning to block 260 from block 270).

When the certificate is provided to the server 132 by the certificate authority 160, the server 132 returns the certificate to the printer 104 at block 275. The certificate is returned to the printer 104 along with a network identifier, such as a URL, of the print server 128.

At block 280, the printer 104 is configured to store the certificate and the network identifier of the print server 128, for subsequent use to establish a secure connection with the print server 128. The print server 128 can, for example, be configured to verify (e.g. with the certificate authority 160) the digital certificate when the printer 104 seeks to connect to the print server 128. The certificate, if verified via the certificate authority 160, also confirms to the print server 128 the identity of the printer 104 and the account identifier with which the printer 104 is associated.

Variations to the above, and additional functionality for provisioning the printer 104, are also contemplated. For example, under some circumstances the printer 104 may need to be deprovisioned, e.g. when being transferred to a new operator or when being retired from service. In such cases, the provisioning server 132 can transmit a de-provisioning command to the printer 104, causing the printer 104 to discard the signed certificate obtained at block 280. The printer 104 is therefore rendered unable to connect to the print server 128. The command may also instruct the printer 104 to set a provisioned state indicator back to un-provisioned, e.g. if the printer 104 is being transferred to a different operator. As a result, the printer 104 will return to emitting the beacon mentioned earlier in connection with block 205.

The provisioning server 132 can also send a notification to the client device 120 currently associated with the printer 104, that the printer 104 is being de-provisioned and will no longer be available for use.

The provisioning server 132 may also send a notification to the print server 128 instructing the print server 128 to refuse further connections from the printer 104, e.g. if the printer 104 is being retired from service.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method to provision a printer, the method comprising:
   receiving a provisioning request from the printer, the provisioning request containing (i) a printer identifier, and (ii) an account identifier associated with the printer;
   obtaining, from a digital certificate issuer, a unique string;
   sending the unique string to the printer;
   receiving from the printer, in response to sending the unique string, a certificate signing request containing (i) the printer identifier, (ii) the account identifier, and (iii) an authentication token including the unique string signed with a private key of the printer;
   validating the certificate signing request;
   passing the validated certificate signing request to the digital certificate issuer;
   receiving, from the digital certificate issuer, a digital certificate encoding the printer identifier and the account identifier; and
   providing the digital certificate to the printer for storage.

2. The method of claim 1, wherein the certificate signing request includes a second digital certificate corresponding to a cryptographic controller of the printer.

3. The method of claim 2, wherein validating the certificate signing request includes verifying a chain of trust for the second digital certificate.

4. The method of claim 2, wherein validating the certificate signing request includes:
   retrieving manufacturing data corresponding to the printer; and
   verifying that the manufacturing data indicates an association between the printer identifier and the second digital certificate.

5. The method of claim 1, wherein validating the certificate signing request includes determining whether the printer identifier is present in a repository of manufacturing data.

6. The method of claim 1, wherein providing the digital certificate to the printer includes sending (i) the digital certificate, and (ii) a network identifier of a print server, for use by the printer to establish a secure connection with the print server using the digital certificate.

7. The method of claim 6, further comprising:
   receiving an indication that the printer is to be decommissioned; and
   transmitting a decommissioning command to at least one of the print server and a client computing device associated with the account identifier, for causing the printer to discard the digital certificate.

8. A provisioning server, comprising:
   a communications interface; and
   a processor configured to:
      receive a provisioning request from a printer, the provisioning request containing (i) a printer identifier, and (ii) an account identifier associated with the printer;
      obtain, from a digital certificate issuer, a unique string;
      send the unique string to the printer;
      receive from the printer, in response to sending the unique string, a certificate signing request containing (i) the printer identifier, (ii) the account identifier, and (iii) an authentication token including the unique string signed with a private key of the printer;
      validate the certificate signing request;
      pass the certificate signing request to the digital certificate issuer;
      receive, from the digital certificate issuer, a digital certificate encoding the printer identifier and the account identifier; and
      provide the digital certificate to the printer for storage.

9. The provisioning server of claim 8, wherein the certificate signing request includes a second digital certificate corresponding to a cryptographic controller of the printer.

10. The provisioning server of claim 9, wherein the processor is configured, to validate the certificate signing request, to verify a chain of trust for the second digital certificate.

11. The provisioning server of claim 9, wherein the processor is configured, to validate the certificate signing request, to:
   retrieve manufacturing data corresponding to the printer; and verify that the manufacturing data indicates an association between the printer identifier and the second digital certificate.

12. The provisioning server of claim 8, wherein the processor is configured, to validate the certificate signing request, to determine whether the printer identifier is present in a repository of manufacturing data.

13. The provisioning server of claim 8, wherein the processor is configured, to provide the digital certificate to the printer, to send (i) the digital certificate, and (ii) a network identifier of a print server, for use by the printer to establish a secure connection with the print server using the digital certificate.

14. The provisioning server of claim 13, wherein the processor is further configured to:
  receive an indication that the printer is to be decommissioned; and
  transmit a decommissioning command to at least one of the print server and a client computing device associated with the account identifier, for causing the printer to discard the digital certificate.

15. A method to provision a printer, comprising:
  obtaining, at the printer, (i) a network identifier of a provisioning server, and (ii) an account identifier associated with the printer;
  transmitting, to the provisioning server using the network identifier, a provisioning request containing (i) a printer identifier, and (ii) the account identifier;
  receiving a unique string from the provisioning server;
  generating a certificate signing request containing (i) the printer identifier, (ii) the account identifier, and (iii) an authentication token based on the unique string;
  sending the certificate signing request to the provisioning server for validation;
  receiving a digital certificate encoding the printer identifier and the account identifier; and
  storing the digital certificate in a memory of the printer.

16. The method of claim 15, further comprising:
  receiving, with the digital certificate, a second network identifier corresponding to a print server; and
  establishing a connection with the print server using the second network identifier and the digital certificate.

17. The method of claim 15, wherein obtaining the network identifier and the account identifier includes:
  emitting a beacon containing an un-provisioned status indicator;
  establishing a connection with a client computing device; and
  receiving the network identifier and the account identifier from the client computing device.

18. The method of claim 15, wherein generating the certificate signing request includes:
  generating the authentication token by signing the unique string with a private key of the printer.

19. The method of claim 18, wherein the private key is associated with a cryptographic accelerator of the printer.

20. The method of claim 15, further comprising:
  receiving a de-provisioning command; and
  discarding the digital certificate.

\* \* \* \* \*